(12) United States Patent
Yuan (10) Patent No.: US 8,768,169 B2
(45) Date of Patent: Jul. 1, 2014

(54) TIME SYNCHRONIZATION METHOD AND SYSTEM FOR A PASSIVE OPTICAL NETWORK SYSTEM

(75) Inventor: Liquan Yuan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 13/141,330

(22) PCT Filed: Dec. 21, 2009

(86) PCT No.: PCT/CN2009/075787
§ 371 (c)(1),
(2), (4) Date: Jun. 22, 2011

(87) PCT Pub. No.: WO2010/088830
PCT Pub. Date: Aug. 12, 2010

(65) Prior Publication Data
US 2011/0262133 A1    Oct. 27, 2011

(30) Foreign Application Priority Data
Feb. 4, 2009    (CN) .......................... 2009 1 0105318

(51) Int. Cl.
*H04B 10/00*    (2013.01)
(52) U.S. Cl.
USPC ............................................. 398/72; 398/66
(58) Field of Classification Search
USPC ..................................................... 398/66–73
See application file for complete search history.

(56) References Cited

U.S. PATENT DOCUMENTS

| | | | |
|---|---|---|---|
| 7,376,136 B2 * | 5/2008 | Song et al. ................... | 370/392 |
| 7,525,982 B2 * | 4/2009 | Kramer et al. ................ | 370/431 |
| 7,983,308 B1 * | 7/2011 | Johnston et al. .............. | 370/514 |
| 7,991,296 B1 * | 8/2011 | Johnston et al. .............. | 398/154 |
| 8,064,484 B2 * | 11/2011 | Zampetti ....................... | 370/503 |
| 8,064,485 B1 * | 11/2011 | Montini et al. ................ | 370/503 |
| 8,270,832 B2 * | 9/2012 | Luo et al. ........................ | 398/67 |
| 8,335,437 B2 * | 12/2012 | Zhao et al. .................... | 398/154 |

(Continued)

FOREIGN PATENT DOCUMENTS

| | | |
|---|---|---|
| CN | 101145846 A | 3/2008 |
| CN | 101227236 A | 7/2008 |

(Continued)

OTHER PUBLICATIONS

International Search Report in international application No. PCT/CN2009/075787, mailed on Mar. 25, 2010.

(Continued)

*Primary Examiner* — Agustin Bello
(74) *Attorney, Agent, or Firm* — Oppedahl Patent Law Firm LLC (57) ABSTRACT

The invention discloses a time synchronization method and system for a passive optical network (PON) system to solve the problem that an ONU cannot be synchronized with an OLT accurately in the PON. The invention implements the time information synchronization between the ONU and the OLT by using a management path. The time information includes an information transmission delay between the ONU and the OLT and the sending time identifier information of the time information. The invention avoids the technical defect of the unfixed delay for an upper layer protocol data message in a GPON by using the characteristic that a PLOAM message or an OMCI message is not segmented during the transmission thereof in the PON, thus ensuring every ONU can be synchronized with the OLT accurately.

8 Claims, 4 Drawing Sheets

(56) References Cited

U.S. PATENT DOCUMENTS

| | | | |
|---|---|---|---|
| 8,351,787 B2* | 1/2013 | Luo et al. | 398/66 |
| 2002/0171895 A1* | 11/2002 | Chang | 359/168 |
| 2003/0039272 A1* | 2/2003 | Dudziak et al. | 370/503 |
| 2003/0133460 A1 | 7/2003 | Lee | |
| 2007/0003282 A1* | 1/2007 | Boyd et al. | 398/72 |
| 2007/0291777 A1* | 12/2007 | Jamieson et al. | 370/401 |
| 2008/0031283 A1 | 2/2008 | Curran-Gray | |
| 2008/0049743 A1* | 2/2008 | Zampetti | 370/389 |
| 2008/0080562 A1* | 4/2008 | Burch et al. | 370/503 |
| 2008/0117938 A1* | 5/2008 | Erich et al. | 370/503 |
| 2008/0187312 A1 | 8/2008 | Tohru | |
| 2009/0016714 A1* | 1/2009 | Soto et al. | 398/20 |
| 2009/0067850 A1* | 3/2009 | Mizutani et al. | 398/154 |
| 2009/0080891 A1* | 3/2009 | Kazawa et al. | 398/79 |
| 2009/0142062 A1* | 6/2009 | Harrison et al. | 398/98 |
| 2009/0245790 A1* | 10/2009 | Mizutani et al. | 398/43 |
| 2009/0245802 A1* | 10/2009 | Bugenhagen | 398/98 |
| 2010/0098433 A1* | 4/2010 | Boyd et al. | 398/155 |
| 2011/0076031 A1* | 3/2011 | Surek et al. | 398/161 |
| 2011/0262133 A1* | 10/2011 | Yuan | 398/43 |
| 2012/0093513 A1* | 4/2012 | Luo et al. | 398/66 |

FOREIGN PATENT DOCUMENTS

| | | |
|---|---|---|
| EP | 1330077 A1 | 7/2003 |
| JP | 2000307589 A | 11/2000 |
| JP | 2009005070 A | 1/2009 |
| JP | 2010028696 A | 2/2010 |
| KR | 20040063453 A | 7/2004 |
| WO | 2008129593 A1 | 10/2008 |

OTHER PUBLICATIONS

English Translation of the Written Opinion of the International Search Authority in international application No. PCT/CN2009/075787, mailed on Mar. 25, 2010.

A new implementation scheme of E1 over EPON Apr. 2005.

Supplementary European Search Report in European application number: 09839547.8, mailed on Apr. 17, 2014.

* cited by examiner

TIME SYNCHRONIZATION METHOD AND SYSTEM FOR A PASSIVE OPTICAL NETWORK SYSTEM

TECHNICAL FIELD

The invention relates to the technical field of Passive Optical Networks (PONs), in particular to a time synchronization method and a synchronization system for a PON system.

BACKGROUND

The time synchronization in communication systems is to coordinate the time of communication equipment with the universal time, also called phase synchronization.

A communication network, especially wireless devices, requires the synchronization among communication systems. Table 1 lists the specific requirements of wireless devices on the synchronization:

TABLE 1

| Wireless Technology | Requirement on Clock Frequency Accuracy | Requirement on Time Synchronization |
| --- | --- | --- |
| GSM | 0.05 ppm | NA |
| WCDMA | 0.05 ppm | NA |
| CDMA2000 | 0.05 ppm | 3 us |
| TD-SCDMA | 0.05 ppm | 1.5 us |
| WiMax | 0.05 ppm | 1 us |
| LTE | 0.05 ppm | Inclined to adopt time synchronization |

The Passive Optical Network (PON) technology is a point to multipoint optical access technology, and a PON consists of an Optical Line Terminal (OLT) on the office side, an Optical Network Unit (ONU) on the user side and an Optical Distribution Network (ODN). The PON has multiple types, and can be roughly divided into a wavelength division PON, a power PON and a hybrid PON combined by the two types above. The power PON is further divided into an ATM (asynchronous transfer mode) Passive Optical Network (APON), a Gigabit Passive Optical Network (GPON) and an Ethernet Passive Optical Network (EPON) based on different protocols of link layers.

The power PON generally adopts a Time Division Multiplex (TDM) broadcast mode and a Time Division Multiple Access (TDMA) mode for the downlink and uplink thereof respectively, and can flexibly constitute tree, star and bus and other topological structures (typically, the tree structure).

The so-called hybrid PON refers to that multiple power PONs are available in an ODN, and adopt different wavelengths.

Figure 1:
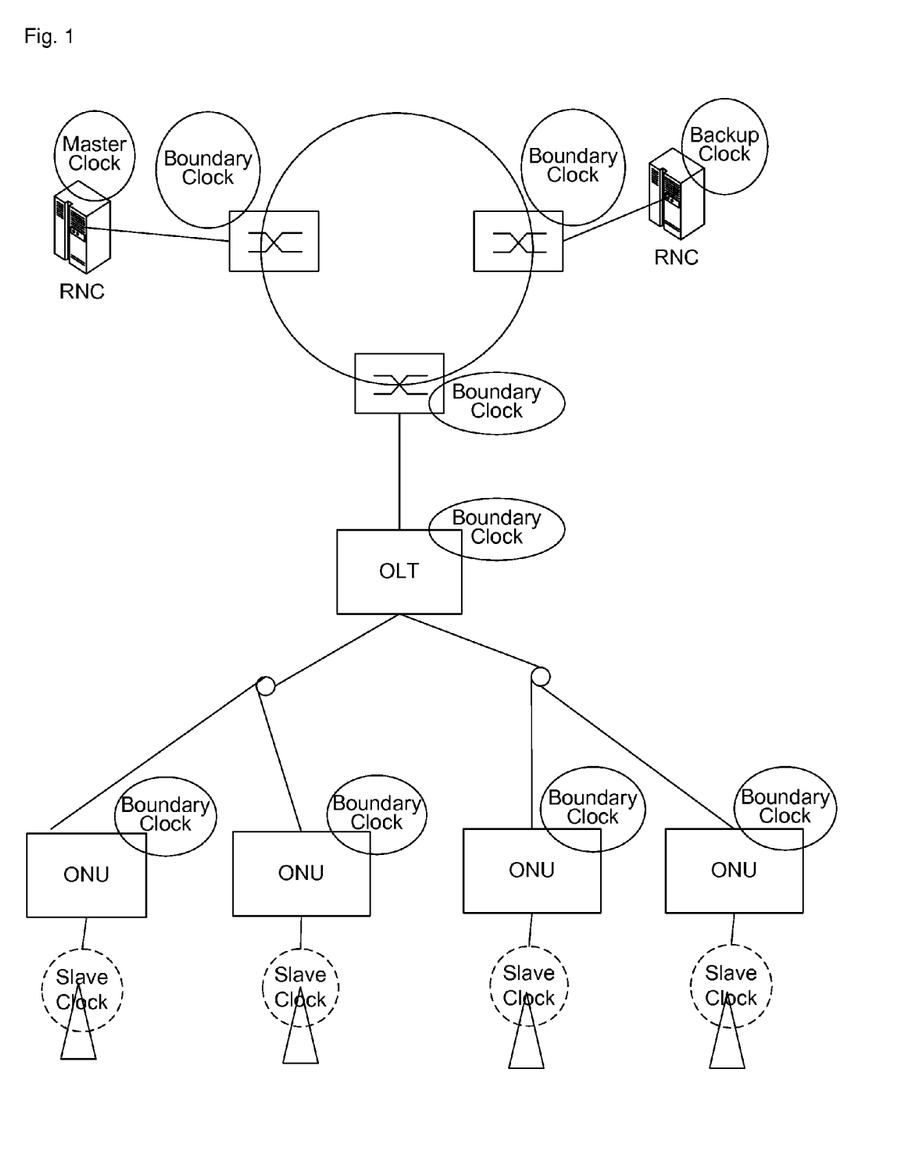
FIG. 1 is a schematic diagram illustrating the networking and clock transfer of a PON in the field of mobile communications.

The PON can be used as a bearer network in an access section. FIG. 1 illustrates a diagram of networking and clock transfer of a PON in the field of mobile communications, and typical networking of the PON in the mobile communications is shown as FIG. 1. It is needed for the PON to complete the transfer of two tasks: service stream transfer and clock synchronization transfer, and FIG. 1 shows the transfer and distribution mode of a clock stream.

The PON protocol only realizes the frequency synchronization per se, i.e. the synchronization of an ONU to an OLT; however, the phase difference between ONUs is random, i.e. incapable of supporting the time synchronization, thereby not realizing the mobile communications or the network utilization that requires the time synchronization.

IEEE1588 can realize the time synchronization among network devices that 1) based on the assumption of network characteristic symmetry, a master and slave mode is used to tag a timestamp on a packet, and periodically distribute a clock, and a receiver measures the clock offset and the delay;

2) a point-to-point link can provide the highest accuracy, and a boundary clock is introduced, independent of delay jitter, and can reach the time accuracy of 10 ns every hop; and 3) the frequency synchronization and the time synchronization can be realized.

Figure 2:
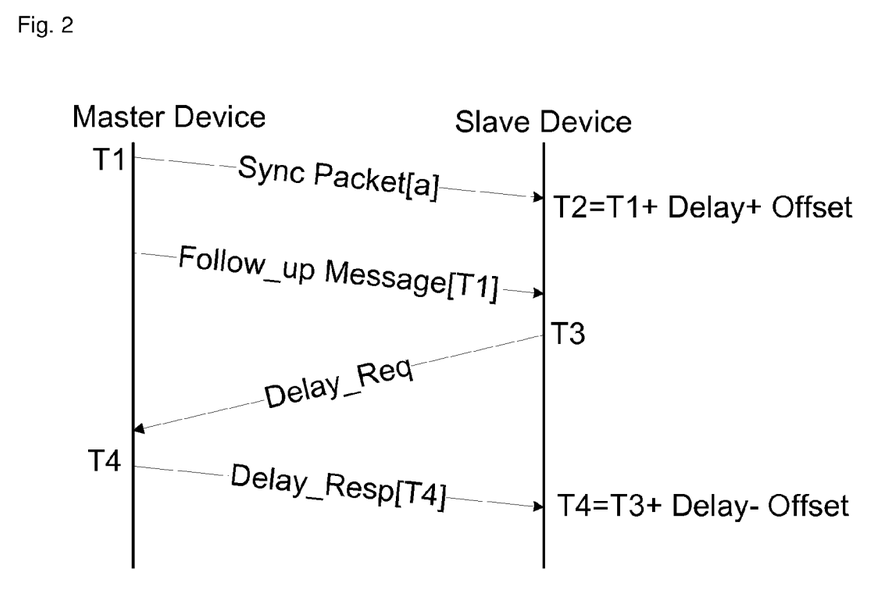
FIG. 2 is a schematic diagram illustrating an implementation mechanism of the IEEE1588 protocol.

The following describes the detailed implementation mechanism, and FIG. 2 illustrates a diagram of the implementation mechanism of the IEEE1588 protocol.

1) Provided that the time difference between a Master device and a Slave device is "Offset";

2) the Master device sends a synchronization packet with a timestamp to the Slave device at the time of T1, and the Slave device locally receives a synchronization message at the time of T2; the following equation can be established, wherein the "Delay" is the transmission delay of the synchronization message from the Master device to the Slave device;

$$T2 = T1 + \text{Delay} + \text{Offset} \quad (1)$$

3) the Master device sends a Follow_up message to the Slave device;

4) the Slave device sends a Delay_Req (delay request) message to the Master device at the local time of T3;

5) the Master device sends a Delay_Resp (delay response) message to the Slave device at the local time of T4; the following equation can be established:

$$T4 = T3 + \text{Delay} - \text{Offset} \quad (2)$$

6) the value of the "Offset" can be calculated by combining Equation (1) with Equation (2);

7) if the Sync message, Follow_up message, Delay_Req message and the Delay_Resp message can be periodically sent between the Master and Slave devices, the value of the "Offset" can be dynamically updated, thereby keeping the Slave device synchronized to the Master device in time; and 8) a time accuracy of 10 ns can be obtained between the Master and Slave devices.

From the above, it can be known that the IEEE1588 protocol is based on an assumption of the network characteristic symmetry, i.e. the delay and jitter from the Master device to the Slave device is the same with those from the Slave device to the Master device, and the accuracy of time synchronization is directly depended on the jitter magnitude of a link.

Figure 3:
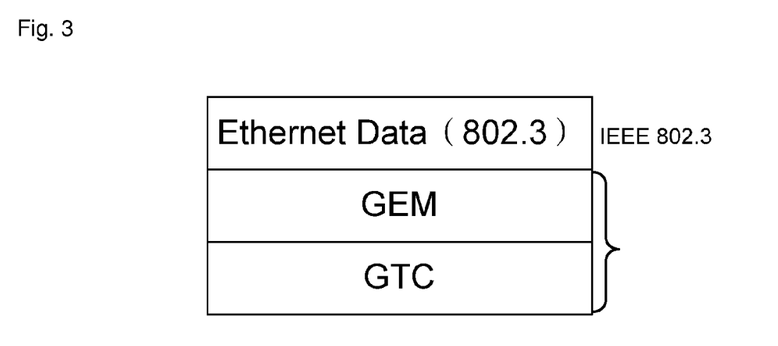
FIG. 3 illustrates a protocol stack of an Ethernet protocol packet bore by a GPON.

The GPON (i.e. a PON defined by the ITU G.984.1-4 specifications) bearing an Ethernet service refers to that the GPON bears a protocol stack of an Ethernet protocol packet, as shown in FIG. 3. To improve the bearing efficiency, a GPON encapsulation method (GEM) layer can segment and recombine packets for an upper layer service data stream, so that a message of the upper layer data stream is possibly segmented into multiple parts, each of which is sent at unfixed and different time, and a receiving terminal detects that whether all the segmented parts of a data packet have arrived, and, if so, implements an encapsulation to recover a complete upper layer data message. However, for the upper layer data message, the GPON is a delay-varying network, i.e. the jitter thereof is large, so that the IEEE1588 protocol cannot run on the GPON directly. Therefore, the accurate time synchronization of the ONU with the OLT cannot be guaranteed in the PON.

SUMMARY

Accordingly, the objective of the invention is to provide a time synchronization method for a PON system to solve the problem that an ONU cannot be synchronized with an OLT accurately in time in the PON.

A time synchronization method of a PON for implementing time synchronization from an Optical Line Terminal (OLT) to an Optical Network Unit (ONU) comprises:

transferring time information between the OLT and the ONU by using a management path;

wherein the time information includes a transmission delay between the OLT and the ONU and the sending time identifier information of the time information; and calculating a time offset between the ONU and the OLT by the ONU according to the time information and implementing the time synchronization with the OLT.

Furthermore, the management path may be a Physical Layer Operation Administration Maintenance (PLOAM) message path; and the sending time identifier information of the time information may be the sending time of a PLOAM message.

Furthermore, the management path may be an ONU Management and Control Interface (OMCI) message path; and the sending time identifier information of the sending time may comprise the sending time of a frame triggering the time synchronization and the frame number of the frame.

Further, the time offset between the ONU and the OLT may be the difference between the local time of the ONU and the sum of the sending time of the time information and the transmission delay.

Further, the information transmission delay may be obtained by the distance measuring function of the PON system, or by the measurement through simulating the IEEE1588 protocol by using the PLOAM message path.

Based on the method above, the invention further provides a time synchronization system for the PON, comprising:

an OLT time synchronization receiving and processing module, used for realizing time synchronization with a superior device; an OLT time information sending module, used for calculating a transmission delay between an OLT and an ONU and transferring time information to the ONU by using a management path, wherein the time information comprises the transmission delay between the ONU and the OLT and the sending time identifier information of the time information; and an ONU time synchronization receiving and processing module, used for receiving time information from the OLT, calculating a time offset between the ONU and the OLT according to the time information and implementing the time synchronization with the OLT.

Furthermore, the OLT time information sending module may transfer the time information to the ONU by using a PLOAM message path, and the sending time identifier information of the time information may be the sending time of a PLOAM message.

Further, the OLT time information sending module may transfer the time information to the ONU by using an OMCI message path, and the sending time identifier information of the time information may comprise the sending time of a frame triggering the time synchronization and the frame number of the frame.

Furthermore, the time offset may be the difference between the local time of the ONU and the sum of the sending time of the time information and the transmission delay.

Furthermore, the information transmission delay may be obtained by the distance measuring function of the PON system, or by the measurement through simulating the IEEE1588 protocol by using the PLOAM message path.

The invention realizes the transfer of time in the PON section by the specific PLOAM message path or OMCI message path of a GPON, and a PLOAM message or an OMCI message is not segmented during the transmission thereof in the PON section, thus avoiding the technical defect of the unfixed delay for an upper layer protocol data message in the GPON and guaranteeing that every ONU can be synchronized with the OLT accurately.

DETAILED DESCRIPTION

The following explains the present invention with reference to the drawings and in conjunction with the embodiments in detail.

Figure 4:
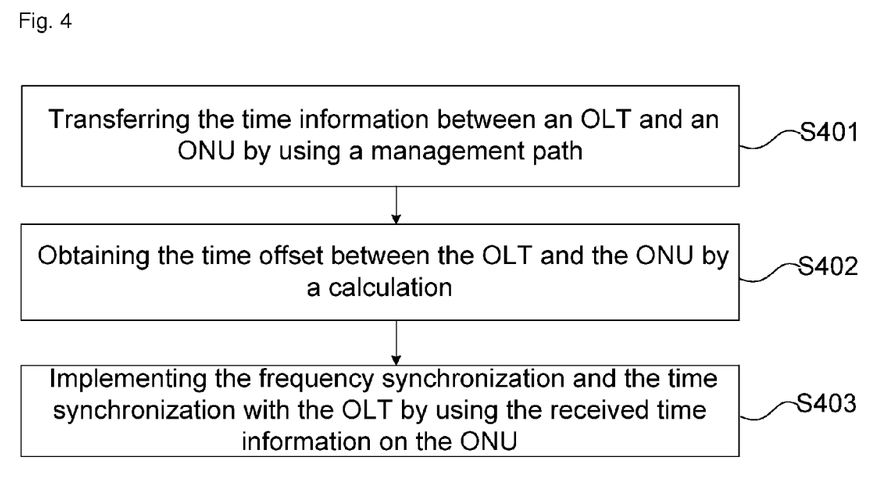
FIG. 4 is a flowchart illustrating a time synchronization method for a PON according to an embodiment of the invention.

FIG. 4 is a flowchart illustrating a time synchronization method for a PON according to an embodiment of the invention, in which, a time synchronization method for a PON is provided, including: implementing time synchronization from an OLT to an ONU, further including the following steps:

S401: transferring time information between the OLT and the ONU by using a management path, wherein the time information includes a transmission delay between the OLT and the ONU, and the transmission delay can be obtained by the distance measuring function of a PON system, or by the measurement through simulating the IEEE1588 protocol by using a Physical Layer Operation Administration Maintenance (PLOAM) message including the information identical to the IEEE1588 protocol; and the management path can be a PLOAM message path or an ONU Management and Control Interface (OMCI) message path;

S402: obtaining time offset ("Offset") between the OLT and the ONU by calculation;

S403: implementing the frequency synchronization and the time synchronization with the OLT by using the received time information on the ONU.

(1) If the management path adopts a PLOAM message path, the time information further includes the sending time of a PLOAM message, i.e. the local time of the OLT when the PLOAM message is sent; the ONU calculates to obtain the time offset between the OLT and the ONU based on the sending time of the PLOAM message which is included in the received PLOAM message and, the transmission delay or the information for calculating to obtain the transmission delay, and implements the frequency synchronization and the time synchronization based on the time offset obtained by calculation.

Wherein the PLOAM message includes the information of second and nanosecond.

The PLOAM message containing time information is required to be sent periodically.

(2) If the management path adopts an OMCI message path, the time information further includes the sending time for sending a frame triggering time synchronization by the OLT and the frame number of the frame. After receiving the frame triggering time synchronization, the ONU calculates a time offset ("Offset") between the OLT and the ONU according to the sending time of the frame and a transmission delay, and implements frequency synchronization and the time synchronization based on the time offset obtained by calculation.

The synchronization method according to the embodiment of the invention may further includes: implementing time synchronization between the OLT and a superior device of the OLT by using the method of the IEEE1588 protocol before the OLT sends a message in the form of PLOAM to the ONU.

According to the synchronization method of the embodiment of the invention, time synchronization is implemented between the ONU and an inferior device of the ONU by using the method of the IEEE1588 protocol. Therefore, the time synchronization between the inferior device connected with the ONU and superior network connected with the OLT is guaranteed, and the relay transmission of time is realized in the PON section.

In the embodiment of the invention, an IEEE1588 clock protocol runs between the OLT and the superior device, and between the ONU and the inferior device, and the transfer of time is realized by periodically using a message in the form of PLOAM between the OLT and the ONU in the PON section of the OLT and the ONU. The embodiment is applicable to the PON section, and implements time synchronizations between the superior device and the OLT, and between the inferior device and the ONU.

The embodiment of the invention realizes the transfer of time in the PON section by using the specific PLOAM message path or the OMCI message path of the GPON. the PLOAM message or the OMCI message is not segmented during the transmission thereof. The PLOAM message is sent as a whole to avoid the GPON characteristic of the unfixed delay for an upper layer protocol data message. The synchronous transfer of time is realized in the PON and guarantees that every ONU has the same time. If a standard IEEE1588 protocol runs between the ONU and an inferior device of the ONU, the ONU can also transfer the time to the inferior device accurately and guarantee the same time among the inferior devices of every ONU.

Figure 5:
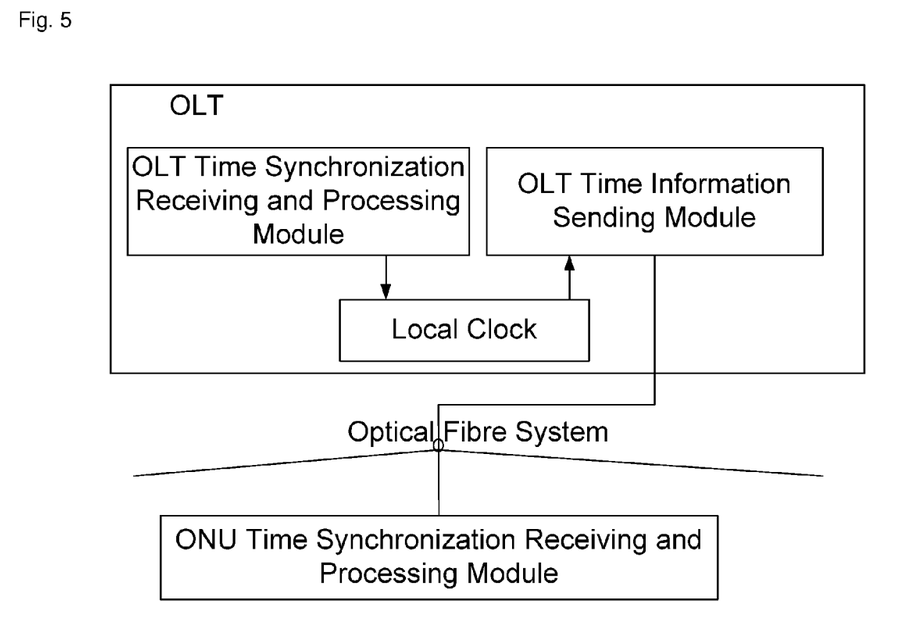
FIG. 5 is a block diagram illustrating a time synchronization system for a PON according to an embodiment of the invention.

FIG. 5 is a block diagram illustrating a time synchronization system for a PON according to an embodiment of the invention. The system includes: an OLT time synchronization receiving and processing module, an OLT time information sending module, an optical fibre system for transferring time information and an ONU time synchronization receiving and processing module, wherein:

The OLT time synchronization receiving and processing module is used for realizing the time synchronization with a superior device, regulating the local time according to the time information sent by the superior device, thereby synchronizing the time of the OLT with that of the superior device accurately.

The OLT time information sending module is used for calculating a transmission delay between the OLT and the ONU and transferring the time information through a management path. The OLT may also send information for calculating the transmission delay between the OLT and the ONU to the ONU which calculates the transmission delay between the OLT and the ONU.

The management path can further bear the time information by using a PLOAM message in the PON system. In such mode, the time information includes the sending time of the PLOAM message and the transmission delay between the OLT and the ONU or the information for calculating and obtaining the transmission delay.

The management path can further use an OMCI path of the GPON system. In such mode, the time information includes the transmission delay between the OLT and the ONU, the sending time of sending a frame triggering time synchronization by the OLT and the frame number of the frame.

Wherein the optical fibre system for transferring time information is a point to multipoint optical fibre system serving as a physical medium for bearing the time information.

Wherein the ONU time synchronization receiving and processing module is used for receiving time information from the OLT and calculating a time offset between the OLT and the ONU according to the time information, thereby synchronizing the local ONU time.

The embodiment adopts the method of periodically sending a time synchronization message containing the time information between an OLT and an ONU, thus solving the problem that the ONU synchronized with the OLT accurately in time cannot be guaranteed in the PON, furthermore, achieving the time synchronization in the PON.

Figure 6:
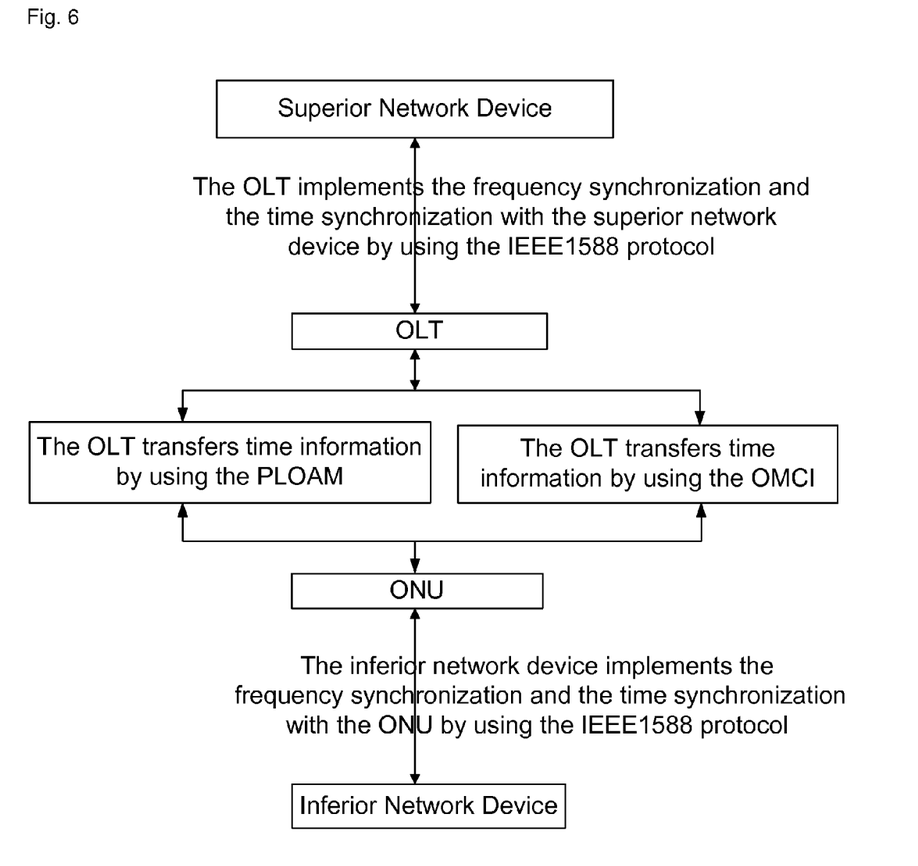
FIG. 6 is a flowchart illustrating a time synchronization method for a PON according to a preferred embodiment of the invention.

FIG. 6 is a flowchart illustrating a time synchronization method for a PON according to a preferred embodiment of the invention. The method for realizing the time synchronization mechanism in the PON of the preferred embodiment specifically includes that:

a standard IEEE1588 protocol runs between an OLT and a device connected to the OLT; a superior device runs in the Master mode; the OLT runs in the Slave mode and is synchronized with the superior device accurately in time.

Provided that a time offset between the "superior device" and the OLT device is "Offset"; and the "superior device" sends a Synchronization (Sync) message with a timestamp to the OLT at the time of T1, and the OLT locally receives the synchronization message at the time of T2. The following equation can be established, wherein "Delay" is a transmission delay of the synchronization message from the "superior device" to the OLT.

$$T2 = T1 + \text{Delay} + \text{Offset} \quad (1)$$

the "superior device" sends a Follow_up message to the OLT;

the OLT sends a Delay_Req message to the "superior device" at the local time of T3; and the "superior device" sends a Delay_Resp message to the OLT at the local time of T4. The following equation is established:

$$T4 = T3 + \text{Delay} - \text{Offset} \quad (2)$$

Calculate the value of "Offset" by combining Equation (1) with Equation (2).

The Sync, Follow_up, Delay_Req and Delay_Resp messages are periodically sent between the "superior device" and the OLT to dynamically update the value of the "Offset".

The dynamic and real-time compensation for the "Offset" in the OLT can synchronize the OLT with the "superior device" in time.

If the OLT is simultaneously connected with two "superior devices", then master and backup clock sources can be realized, the network reliability can be provided, and the selection of the master and backup clock sources can be realized according to the IEEE1588 protocol.

The standard IEEE1588 protocol does not run between the OLT and the ONU. The OLT device runs in the Master mode of the clock, and the ONU runs in the Slave mode of the clock and is synchronized with the OLT accurately in time.

If a PLOAM path is used, a synchronous PLOAM message with a timestamp is sent from the OLT to the ONU at the time of T1, and the ONU locally receives the synchronous PLOAM message at the time of T2, the message sent from the OLT to the ONU includes: T2, wherein T2=T1+Delay, while the time offset ("Offset") between the OLT and the ONU is the difference between the local clock of the ONU and T2, and the ONU regulates the local clock according to the value of the "Offset".

If an OMCI path is used, when T1 which is the time of sending a time synchronization frame is calculated and the ONU locally receives the corresponding frame at the time of T2, wherein T2=T1+Delay. When receiving the frame number, the ONU triggers the local time synchronization with OLT at the time of T2, while the time offset ("Offset") between the OLT and the ONU is the difference between the local clock of the ONU and T2, and the ONU regulates the local clock according to the value of the "Offset".

Wherein the "Delay" can be obtained by the inherent distance measuring method of the GPON. The "Delay" can also be obtained by simulating the 1588 protocol, i.e. simulating the delay measuring process of the 1588 by using a PLOAM message, and the specific method is the same with the method for measuring a point-to-point link by the 1588.

Every ONU is synchronized with the OLT, so that accurate time synchronization among every ONU is realized.

The standard IEEE1588 protocol runs between the ONU and an "inferior device" which is capable of realizing accurate time synchronization with the ONU, and the "inferior device" is a base station in the field of mobile communications.

According to the synchronization methods of the preferred embodiments of the invention, the protocol messages transferring the time are transmitted and received by hardware to guarantee the time accuracy.

Obviously, those skilled in the art should understand that the modules or steps of the present invention can be implemented by general computing devices and centralized in a signal computing device or distributed in a network consisting of multiple computing devices. Optionally, the modules or steps can be implemented by program codes executable by the computing devices, so that they can be stored in a storage device and executed by the computing devices, or respectively made into integrated circuit modules, or some of them can be made into a single integrated circuit module. Thus, the present invention is not limited to any specific combination of hardware and software.

The above are only preferred embodiments of the present invention and not used for limiting the present invention. For those skilled in the art, the present invention may have various modifications and changes. Any modifications, equivalent substitutes, improvements and the like within the spirit and principle of the invention shall fall within the scope of protection of the invention.

What is claimed is:

1. A time synchronization method for a passive optical network, comprising:
    implementing time synchronization between an Optical Line Terminal (OLT) and a superior device of the OLT by using an IEEE1588 protocol;
    implementing time synchronization from the OLT to an Optical Network Unit (ONU) by using a management path, comprising:
        by the OLT, calculating a transmission delay between the OLT and the ONU, and transferring time information from the OLT to the ONU by using the management path, wherein the time information includes the transmission delay between the ONU and the OLT and sending time identifier information of the time information, wherein the sending time identifier information comprises a secondsfield and a nanosecondsfield; and
        by the ONU, calculating a time offset between the ONU and the OLT according to the time information so as to implement the time synchronization with the OLT,
    wherein the management path is an ONU Management and Control Interface (OMCI) message path; and the sending time identifier information of the time information comprises the sending time of a frame triggering the time synchronization and the frame number of the frame.

2. The method according to claim 1, wherein the time offset between the ONU and the OLT is the difference between the local time of the ONU and the sum of the sending time of the time information and the transmission delay.

3. The method according to claim 1, wherein the information transmission delay is obtained by the distance measuring function of the passive optical network system, or by the measurement through simulating the IEEE1588 protocol by using the PLOAM message path.

4. A time synchronization system for a passive optical network, comprising an optical Line Terminal (OLT) and an Optical Network Unit (ONU),
    wherein the OLT comprises:
        an OLT time synchronization receiving and processing module, used for implement time synchronization with a superior device of the OLT by using an IEEE1588 protocol; and
        an OLT time information sending module, used for calculating a transmission delay between the OLT and the ONU, and transferring time information to the ONU through a management path; wherein the time information comprises the transmission delay between the OLT and the ONU and sending time identifier information of the time information, wherein the sending time identifier information comprises a secondsfield and a nanosecondsfield,
    wherein the ONU comprises:
        an ONU time synchronization receiving and processing module, used for receiving the time information from the OLT, and calculating a time offset between the ONU and the OLT according to the time information so as to implement the time synchronization with the OLT,
    wherein the OLT time information sending modules transfers the time information to the ONU by using an OMCI message path, and the sending time identifier information of the time information comprises the sending time of a frame triggering the time synchronization and the frame number of the frame.

5. The system according to claim 4, wherein the time offset is the difference between the local time of the ONU and the sum of the sending time of the time information and the transmission delay.

6. The system according to claim 4, wherein the information transmission delay is obtained by the distance measuring function of the passive optical network system, or the measurement through simulating the IEEE1588 protocol by using the PLOAM message path.

7. The method according to claim 2, wherein the information transmission delay is obtained by the distance measuring function of the passive optical network system, or by the measurement through simulating the IEEE1588 protocol by using the PLOAM message path.

8. The system according to claim 5, wherein the information transmission delay is obtained by the distance measuring function of the passive optical network system, or the measurement through simulating the IEEE1588 protocol by using the PLOAM message path.

* * * * *